(12) United States Patent
Gundavelli et al.

(10) Patent No.: US 11,825,389 B2
(45) Date of Patent: Nov. 21, 2023

(54) MECHANISM TO DELIVER SMS MEANT FOR USER'S PUBLIC OR PRIVATE 5G IDENTITY OVER WLAN NETWORK

(71) Applicant: Cisco Technology, Inc., San Jose, CA (US)

(72) Inventors: Sri Gundavelli, San Jose, CA (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 17/366,857

(22) Filed: Jul. 2, 2021

(65) Prior Publication Data
US 2023/0007448 A1 Jan. 5, 2023

(51) Int. Cl.
*H04W 4/14* (2009.01)
*H04W 12/06* (2021.01)
*H04W 84/12* (2009.01)

(52) U.S. Cl.
CPC ........... *H04W 4/14* (2013.01); *H04W 12/068* (2021.01); *H04W 84/12* (2013.01)

(58) Field of Classification Search
CPC .......................... H04W 12/06; H04L 65/1104
USPC .......................... 370/329, 338; 455/437, 466
See application file for complete search history.

(56) References Cited

U.S. PATENT DOCUMENTS

| | | |
|---|---|---|
| 2016/0205150 A1 | 7/2016 | Shaheen et al. |
| 2017/0048739 A1 | 2/2017 | Jeong et al. |
| 2017/0208501 A1 | 7/2017 | Lee et al. |
| 2019/0394699 A1 | 12/2019 | Nigam et al. |
| 2020/0059983 A1* | 2/2020 | Stauffer ................ H04W 76/12 |
| 2021/0029767 A1 | 1/2021 | Teyeb et al. |
| 2022/0124542 A1* | 4/2022 | Li ........................... H04W 4/80 |
| 2022/0124844 A1* | 4/2022 | Boyapalle ............. H04W 76/12 |
| 2022/0303822 A1* | 9/2022 | Kotecha ............ H04M 15/8228 |

FOREIGN PATENT DOCUMENTS

| | | |
|---|---|---|
| EP | 1515516 | 3/2005 |
| WO | 2003092218 A1 | 11/2003 |
| WO | 2020160176 | 8/2020 |

OTHER PUBLICATIONS

International Search Report and Written Opinion from PCT Application No. PCT/US2022/035527, dated Nov. 14, 2022.

* cited by examiner

*Primary Examiner* — Kiet M Doan
(74) *Attorney, Agent, or Firm* — Polsinelli

(57) ABSTRACT

Systems, methods, and computer-readable media are provided for delivering 5G SMS messages over an enterprise wireless local area network (WLAN). An example method can include associating, by an enterprise WLAN, a client device with the enterprise WLAN by assigning an enterprise WLAN identity to the client device, authenticating, by the enterprise WLAN, the client device, and generating, by the enterprise WLAN, a subscription policy for the client device. The client device can be subscribed to a 5G network. The subscription policy can specify how to route to the client device from the 5G network through the enterprise WLAN.

14 Claims, 11 Drawing Sheets

MECHANISM TO DELIVER SMS MEANT FOR USER'S PUBLIC OR PRIVATE 5G IDENTITY OVER WLAN NETWORK

DESCRIPTION OF THE RELATED TECHNOLOGY

The present technology pertains to a mechanism for delivering Short Message Service (SMS) messages destined to user devices over 5G networks and, more particularly to, delivering SMS messages to user devices destined to a 5G identity associated with the user device over a Wireless Local Area Network (WLAN) network.

BACKGROUND

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks have incorporated network slicing.

In some scenarios, users may have their user devices connected to both a 5G network and a Wireless Local Area Network (WLAN) simultaneously. In some of these scenarios, users may prefer to have messages sent through the 5G network or a WLAN network. However, current technologies may not be equipped to send messages designated for a 5G identity through the WLAN network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
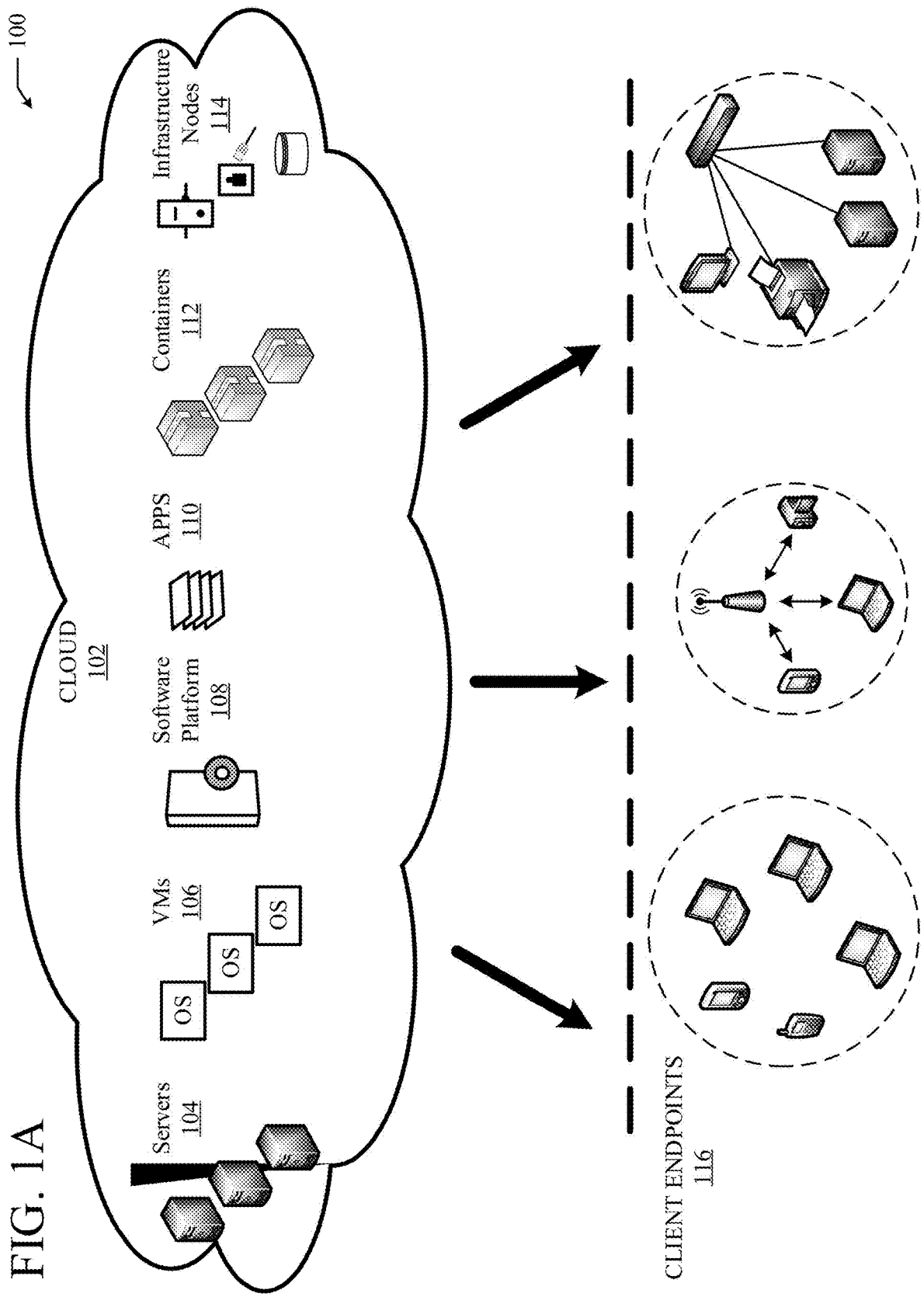
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include associating, by a wireless local area network (WLAN), a client device with the WLAN by assigning a WLAN identity to the client device. The client device can be subscribed to a 5G network. The method can further include authenticating, by the WLAN, the client device, and generating, by the WLAN, a subscription policy for the client device. The subscription policy can specify how to route messages, e.g. SMS messages, to the client device from the 5G network through the WLAN.

A system can include one or more processors and at least one computer-readable storage medium storing instructions which, when executed by the one or more processors, cause the one or more processors to associate, by a wireless local area network, a client device with the WLAN by assign a WLAN identity to the client device, authenticate, by the WLAN, the client device, and generate, by the WLAN, a subscription policy for the client device. The client device can be subscribed to a 5G network. The subscription policy specifies how to route to the client device from the 5G network through the WLAN.

A non-transitory computer-readable storage medium having stored therein instructions which, when executed by a processor, cause the processor to associate, by a wireless local area network, a client device with the WLAN by assign a WLAN identity to the client device, authenticate, by the WLAN, the client device; and generate, by the WLAN, a subscription policy for the client device. The client device can be subscribed to a 5G network. The subscription policy specifies how to route to the client device from the 5G network through the WLAN.

Example Embodiments 5G includes a new SMS Function (SMSF) where Access and Mobility Management Functions modules (AMF) anchor a user equipment (UE) session and register the UE's identity and anchor point with the SMSF. Specifically, messages received by the SMSF are delivered to the AMF, which in turn will deliver the messages to the UE over NAS interfaces. However, such delivery is possible only if the UE is within the range of the public mobile network operator (MNO).

UE can be associated with an enterprise WLAN network and may not be within public MNO coverage. In such scenarios, the subscriber can fail to get SMS delivery sent to its Public mobile station international subscriber directory number (MSISDN). The subscriber is also unable to send SMS to any other cellular subscriber.

Additionally, Private 5G networks may be deployed by enterprises. The deployment of Private 5G services can have coverage deficiencies within a desired physical coverage space of an enterprise. However, these enterprises can continue to have WLAN coverage in the desired physical coverage space of the enterprise, e.g. through other networks. Hence, there can be plenty of coverage holes where the UE is not within Private 5G coverage but has WLAN coverage. In such cases, it can be desirable to deliver SMS messages meant for a UE's Private 5G identity via a WLAN link using a WLAN identity. The UE may be attached to an enterprise Wi-Fi network, or to an OpenRoaming Wi-Fi hotspot, but it should be able to receive SMS messages sent to its public/private 5G identity.

The disclosed technology addresses the need in the art for delivering SMS messages destined for a 5G identity associated with a user device through a WLAN.

Moreover, the disclosed technology provides a mechanism to deliver SMS messages meant for UE's private or public 5G identity via WLAN link using WLAN identity. Further, using this mechanism, the delivery of SMS messages can happen over a plurality of end user devices. Another potential advantage of this mechanism is that SMS messages could be delivered to UE over WLAN OpenRoaming when MNO is used as an identity provider (IDP).

Figure 1B:
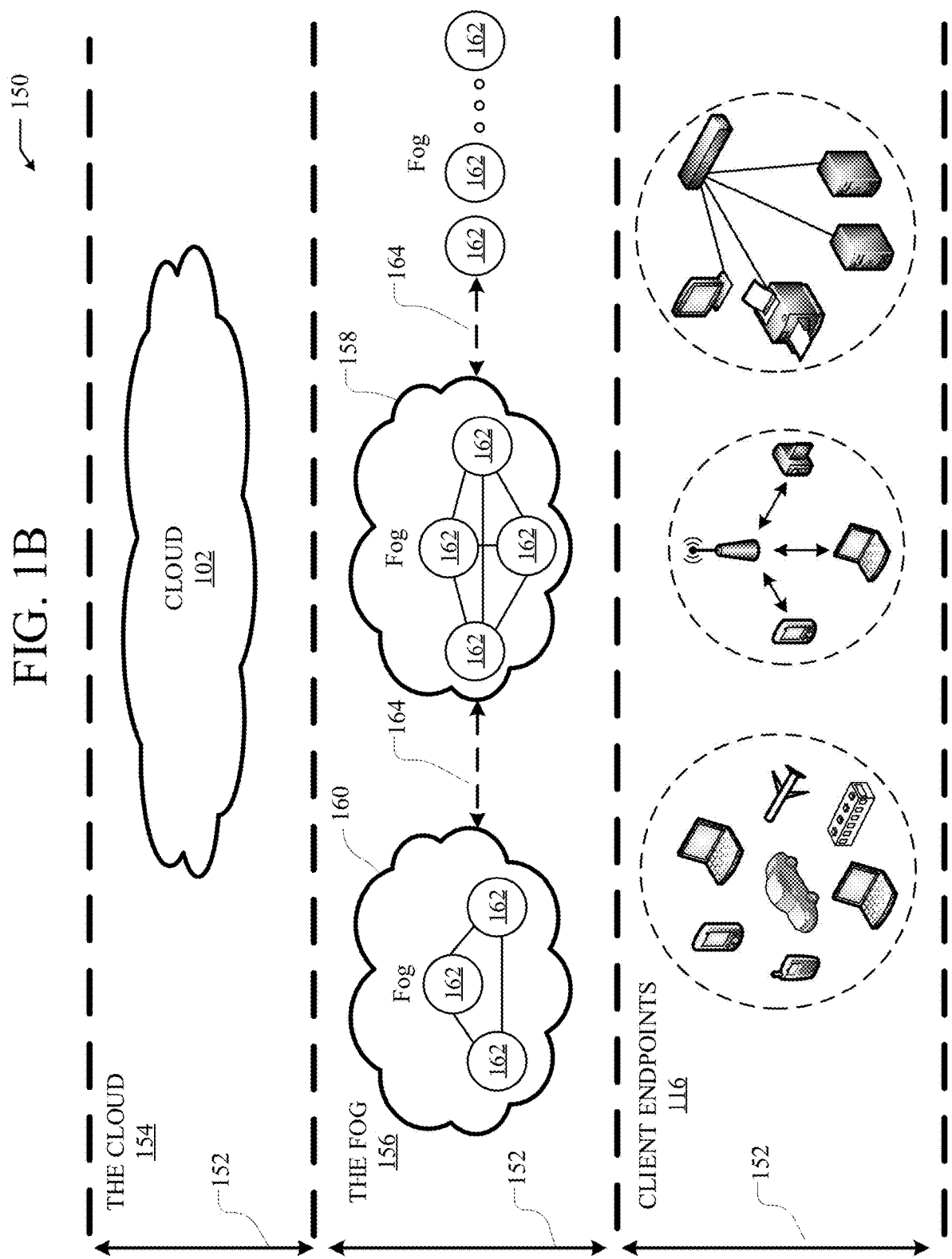
FIG. 1B illustrates an example fog computing architecture.
Figure 2:
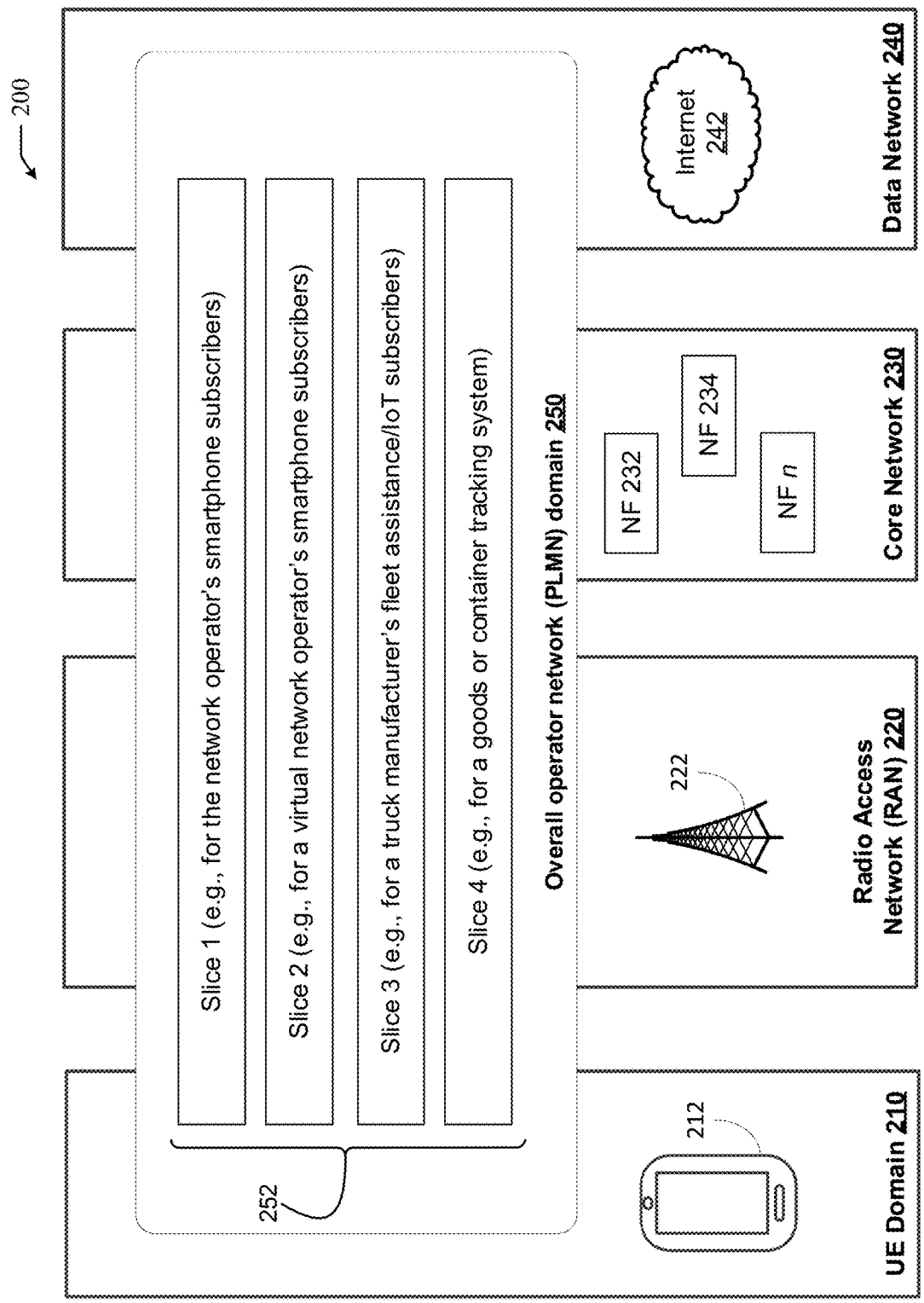
FIG. 2 depicts an exemplary schematic representation of a 5G network environment in which network slicing has been implemented, and in which one or more aspects of the present disclosure may operate.

A description of network environments and architectures for network data access and services, as illustrated in FIGS. 1A, 1B, and 2 is first disclosed herein. A discussion of systems, methods, and computer-readable medium for delivering SMS messages to user devices on a 5G network through a WLAN, as shown in FIGS. 3-6, will then follow. The discussion then concludes with a brief description of an example device, as illustrated in FIG. 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as SaaSs (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 and other application services reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 3:
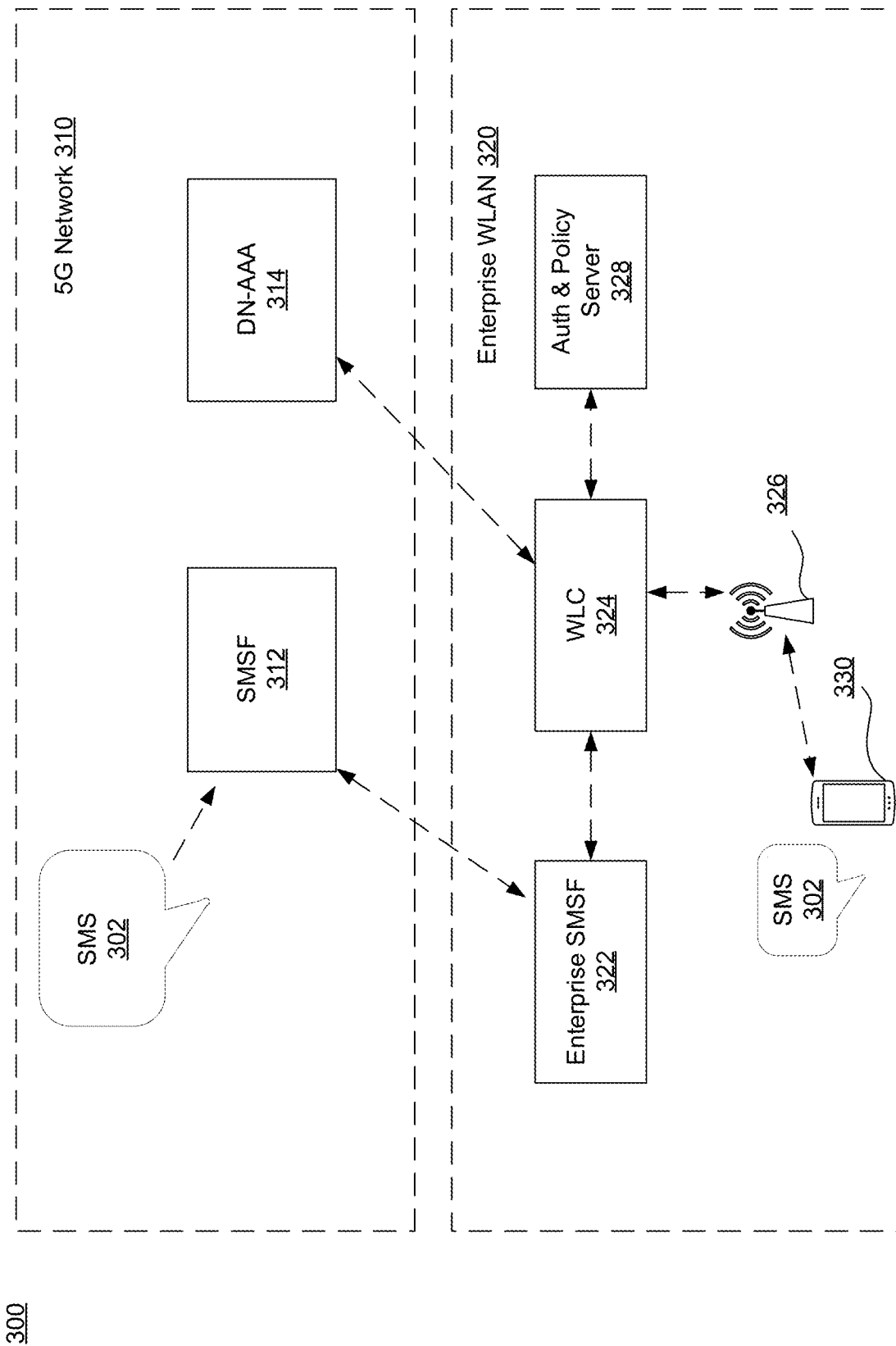
FIG. 3 illustrates an example environment having a user equipment in communication with a public 5G network and a wireless local area network.

FIG. 3 illustrates an example environment 300 having a UE 330 in communication with a 5G network 310 and an enterprise WLAN 320.

5G network 310 can be a public 5G network, such as a 5G network owned by a mobile network operator (MNO). 5G network 310 can include a SMS Function (SMSF) 312 and a Data Network—Authentication, Authorization, and Accounting (DN-AAA) server 314.

SMSF 312 enables SMS over Non-Access Stratum (NAS) by providing SMS management subscription data checking and conducting SMS delivery accordingly. Additionally, SMSF 312 can relay one or more SMS messages 302 between UE 330 and another system (e.g., SMS-GMSC, IWMSC/SMS-Router, enterprise SMSF 512 etc.). Additionally SMSF 312 can handle SMS related call detail records, perform lawful interceptions of SMS messages, and general interactions with an AMF for notification procedures when UE 330 is unavailable for SMS transfer.

DN-AAA 314 performs authentication and authorization for UE 330 connected to 5G network 310. Additionally, DN-AAA 314 can handle accounting of various UE 330.

Enterprise WLAN 320 can include an enterprise SMSF 322, a WLAN controller (WLC) 324 in communication with one or more WLAN access points (AP) 326, an authentication and policy server 328, and a UE 330.

Like SMSF 312, enterprise SMSF 322 provides SMS management subscription data and conducts SMS delivery. More specifically, enterprise SMSF 322 can manage subscription policies and associate UE 330 with private enterprise realms. In other words, enterprise SMSF 322 can associate a public or private 5G identity of UE 330 with a mapped private network realm to facilitate SMS delivery over enterprise WLAN 320.

WLC 324 can establish secure connections to each network device and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the WLC 324 can operate as route reflectors. The WLC 324 can also orchestrate secure connectivity in a data plane between and among the edge network devices. For example, in some embodiments, the WLC 324 can distribute crypto key information among the network device(s). This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the WLC 324.

WLAN APs 326 are one or more networking devices, e.g. wireless termination points, that facilitate UE 330 to connect to enterprise WLAN 320. WLAN APs 326 can also generate or create action frames that can include SMS payloads. WLAN APs 326 can then also send the action frame to UE 330 to deliver SMS messages.

Authentication and policy server 328 authenticates user credentials. Additionally, authentication and policy server 328 can store subscription policies for each UE 330 connected to enterprise WLAN. Furthermore, authentication and policy server can identify and/or otherwise determine which WLC 324 and/or WLAN APs 326 are connected to UE 330.

UE 330 is a user equipment as described above as UE 212 with respect to FIG. 2.

Figure 4A:
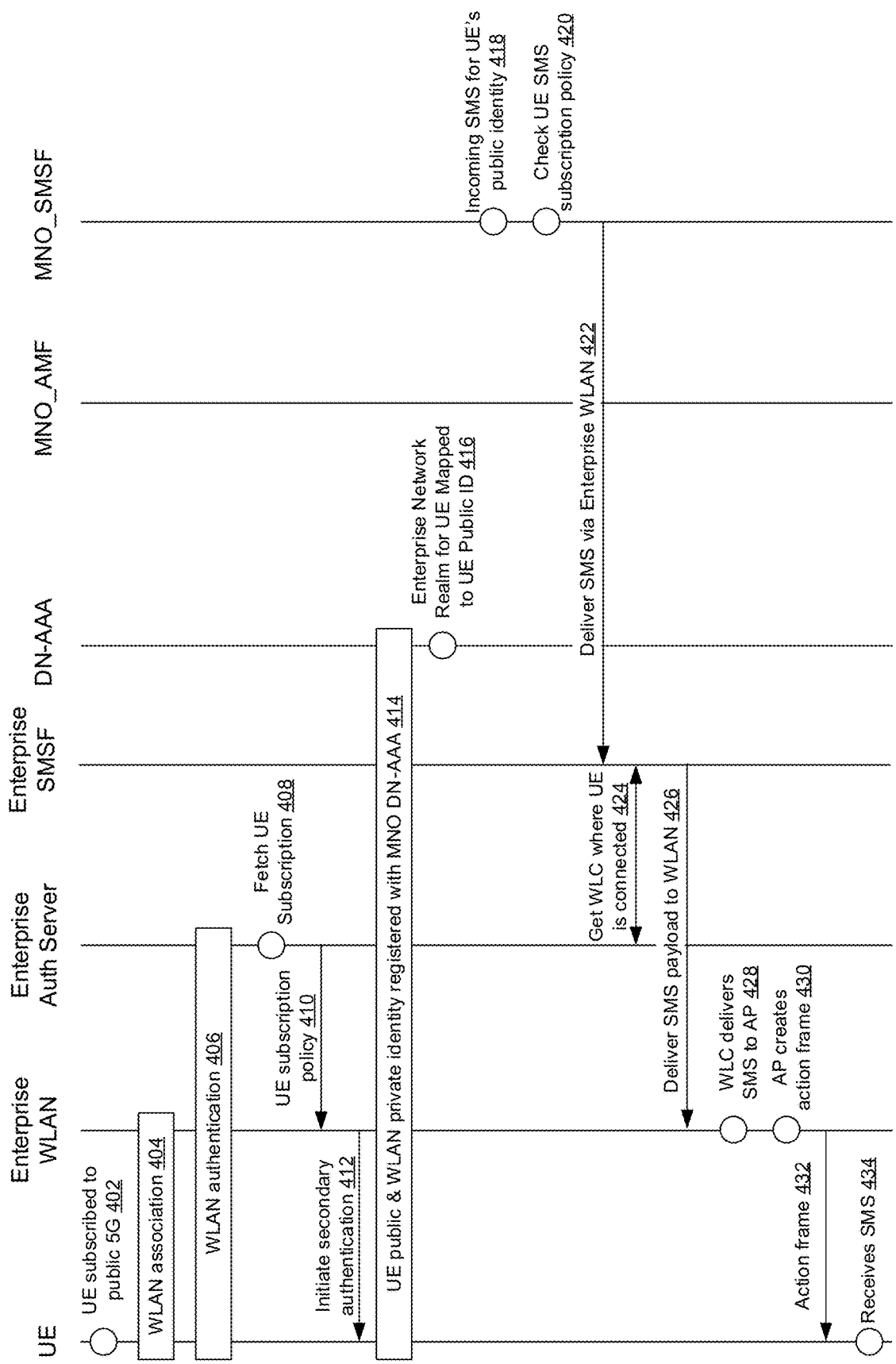
FIG. 4A illustrates an example flow diagram for delivering a short message service message to a user equipment through a public 5G network and an enterprise WLAN.

FIG. 4A illustrates an example flow diagram for delivering a short message service message to a user equipment through a public 5G network and a WLAN enterprise network.

UE (e.g., UE 330 described above with respect to FIG. 3) can be subscribed 402 to a public 5G network as discussed above with respect to FIG. 3. When UE connects to an enterprise WLAN (e.g., enterprise WLAN 320 described above with respect to FIG. 3), enterprise WLAN can associate 404 the UE with the enterprise WLAN. Additionally or alternatively, the UE can associate 404 with the enterprise WLAN.

Next, the enterprise authentication server (e.g., authentication and policy server 328 described above with respect to FIG. 3) can authenticate 406 the UE with the enterprise WLAN. The enterprise authentication server can then fetch 408 a UE subscription policy for the UE. Subsequently, the enterprise authentication server can send 410 the UE subscription policy to the enterprise WLAN.

After receiving the UE subscription policy, the enterprise WLAN can initiate 412 a secondary authentication of the UE to the public MNO DN-AAA (e.g., DN-AAA 314 described above with respect to FIG. 3) over the enterprise WLAN.

When the UE is associated and authenticated, the UE is then registered 414 with the MNO DN-AAA. More specifically, the UE public and WLAN private identity is registered 414 with the MNO DN-AAA after secondary authentication over the enterprise WLAN.

The DN-AAA can then map 416 an enterprise WLAN realm for the UE to the UE public identity.

At some point, MNO SMSF (e.g., SMSF 312 as described above with respect to FIG. 3) may determine 418 that there is an incoming SMS message for the UE's public identity. MNO SMSF can then check 420 the UE's SMS subscription policy for SMS message delivery methods. For example, the subscription policy can indicate public MNO network delivery only, enterprise WLAN delivery only, enterprise private 5G network delivery only, a preferred network delivery, replicate on all networks, etc.

MNO SMSF can then determine that the UE's SMS subscription policy indicates at least some usage of enterprise WLAN delivery. Accordingly, the MNO SMSF can deliver 422 the SMS message via the enterprise WLAN. In some embodiments, the MNO SMSF can also include the public identity of the UE for SMS.

The enterprise SMSF (e.g., enterprise SMSF 322 described above with respect to FIG. 3) can receive the SMS message and get 424 the WLC (e.g., WLC 324 described above with respect to FIG. 3) where the UE is connected using the WLAN UE identity. Then, the enterprise SMSF can deliver 426 the SMS message payload to the enterprise WLAN. Furthermore, the enterprise SMSF can also indicate that the SMS message was directed to or meant for the UE's public identity.

The WLC of the enterprise SMSF can then deliver 428 the SMS message to the WLAN APs (e.g., WLAN APs 326 described above with respect to FIG. 3). In some embodiments, the SMS message can be delivered 428 to the WLAN APs over CAPWAP.

The WLAN APs can then create 430 an 802.11 action frame with the SMS payload. Next, the WLAN APs can send 432 the action frame to the UE. Consequently, the UE receives 434 the SMS message. Additionally, the action frame can include an indication that it was sent to the public identity, or received by the public identity, but delivered via the enterprise WLAN.

Figure 4B:
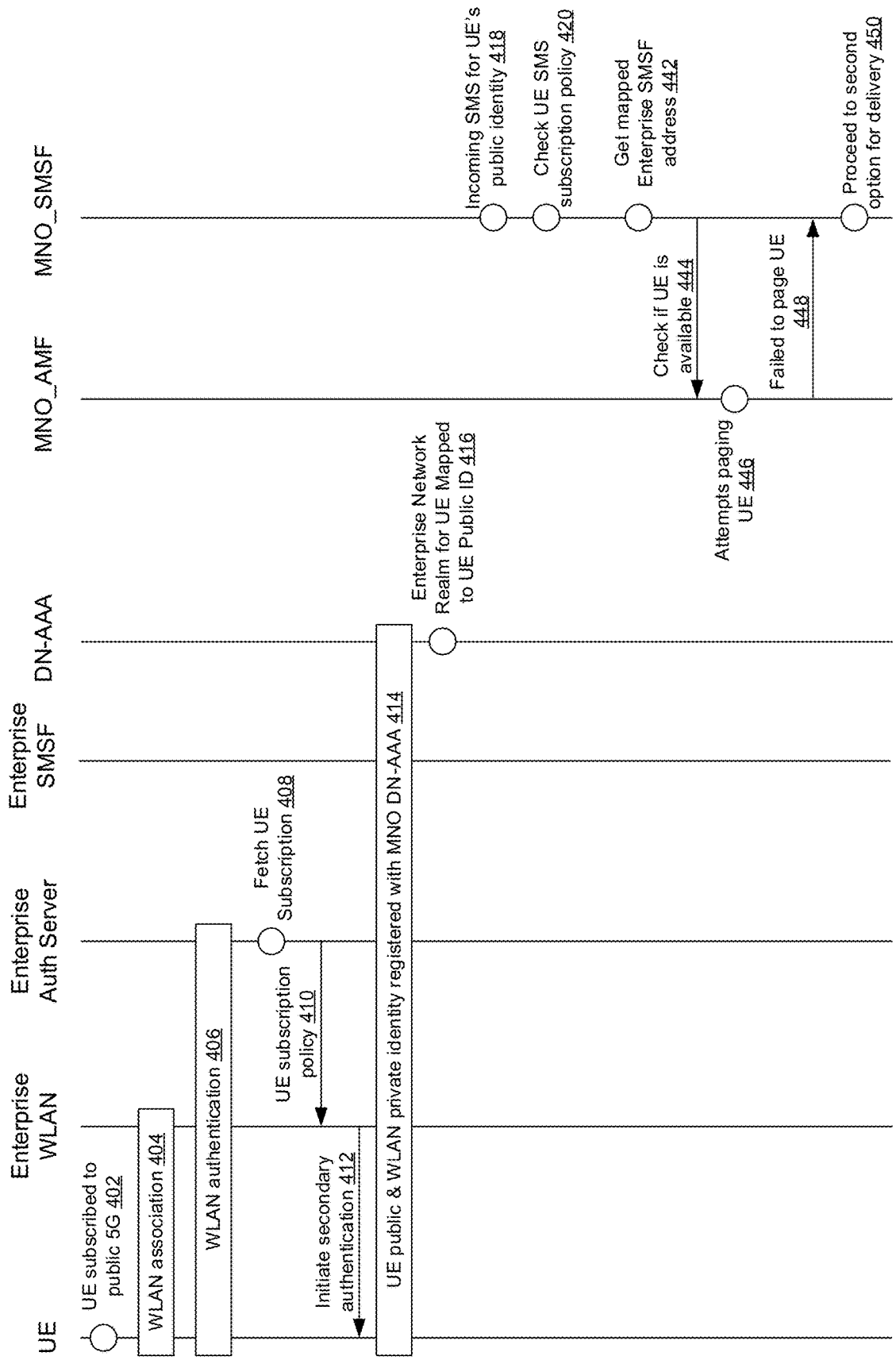
FIG. 4B illustrates an example flow diagram for delivering a short message service message to a user equipment through a public 5G network and an enterprise WLAN.

FIG. 4B illustrates an example flow diagram for delivering a short message service message from a user equipment through a public 5G network and an enterprise WLAN.

UE (e.g., UE 330 described above with respect to FIG. 3) can be subscribed 402 to a public 5G network as discussed above with respect to FIG. 3. When UE connects to an enterprise WLAN (e.g., enterprise WLAN 320 described above with respect to FIG. 3), enterprise WLAN can associate 404 the UE with the enterprise WLAN. Additionally or alternatively, the UE can associate 404 with the enterprise WLAN.

Next, the enterprise authentication server (e.g., authentication and policy server 328 described above with respect to FIG. 3) can authenticate 406 the UE with the enterprise WLAN. The enterprise authentication server can then fetch 408 a UE subscription policy for the UE. Subsequently, the enterprise authentication server can send 410 the UE subscription policy to the enterprise WLAN.

After receiving the UE subscription policy, the enterprise WLAN can initiate 412 a secondary authentication of the UE to the public MNO DN-AAA (e.g., DN-AAA 314 described above with respect to FIG. 3) over the enterprise WLAN.

When the UE is associated and authenticated, the UE is then registered 414 with the MNO DN-AAA. More specifically, the UE public and WLAN private identity is registered 414 with the MNO DN-AAA after secondary authentication over the enterprise WLAN.

The DN-AAA can then map 416 an enterprise WLAN realm for the UE to the UE public identity.

At some point, MNO SMSF (e.g., SMSF 312 as described above with respect to FIG. 3) may determine 418 that there is an incoming SMS message for the UE's public identity. MNO SMSF can then check 420 the UE's SMS subscription policy for SMS message delivery methods. For example, the subscription policy can indicate public MNO network delivery only, enterprise WLAN delivery only, enterprise 5G network delivery only, a preferred network delivery, replicate on all networks, etc.

In some scenarios, the subscription policy may indicate a preference for delivery via public network first, and on-failure, deliver via enterprise WLAN. Thus, MNO SMSF can obtain 442 the UE private network realm from the DN-AAA and private identity of the UE. In other words, the MNO SMSF can get the mapped enterprise SMSF address for the UE public ID. Next, the MNO SMSF can check 444 if the UE is available. Thus, the MNO AMF (e.g., a module of a core network 230 such as 5G network 310 described above with respect to FIGS. 2 and 3) can page 446 the UE. The MNO AMF can then determine 448 a failure to page UE. For example, the MNO AMF may not be able to reach the UE directly. Accordingly, the MNO AMF can notify the MNO SMSF of the failure.

The MNO SMSF can then proceed 450 to a second delivery option (e.g., delivery via enterprise WLAN). The second delivery option can be the steps 422-434 discussed above with respect to FIG. 4A.

Figure 4C:
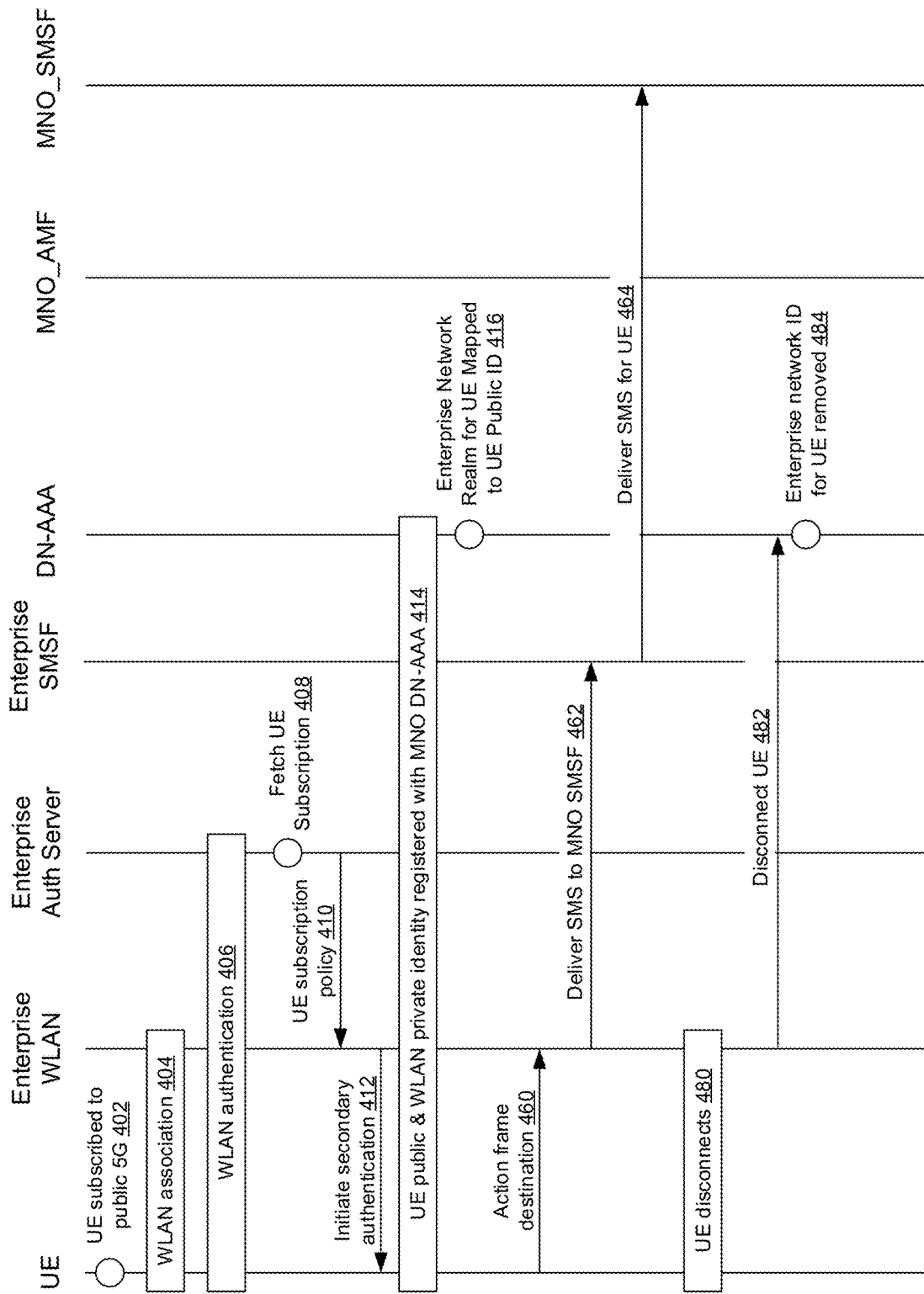
FIG. 4C illustrates an example flow diagram for delivering a short message service message from a user equipment through a public 5G network and an enterprise WLAN.

FIG. 4C illustrates an example flow diagram for delivering a short message service message from a user equipment through a public 5G network and an enterprise WLAN.

UE (e.g., UE 330 described above with respect to FIG. 3) can be subscribed 402 to a public 5G network as discussed above with respect to FIG. 3. When UE connects to an enterprise WLAN (e.g., enterprise WLAN 320 described above with respect to FIG. 3), enterprise WLAN can associate 404 the UE with the enterprise WLAN. Additionally or alternatively, the UE can associate 404 with the enterprise WLAN.

Next, the enterprise authentication server (e.g., authentication and policy server 328 described above with respect to FIG. 3) can authenticate 406 the UE with the enterprise WLAN. The enterprise authentication server can then fetch 408 a UE subscription policy for the UE. Subsequently, the enterprise authentication server can send 410 the UE subscription policy to the enterprise WLAN.

After receiving the UE subscription policy, the enterprise WLAN can initiate 412 a secondary authentication of the UE to the public MNO DN-AAA (e.g., DN-AAA 314 described above with respect to FIG. 3) over the enterprise WLAN.

When the UE is associated and authenticated, the UE is then registered 414 with the MNO DN-AAA. More specifically, the UE public and WLAN private identity is registered 414 with the MNO DN-AAA after secondary authentication over the enterprise WLAN.

The DN-AAA can then map 416 an enterprise WLAN realm for the UE to the UE public identity.

At some point, the UE may attempt to send an SMS over the enterprise WLAN. The UE can then send 460 an action frame destination containing the SMS payload to the enterprise WLAN. The enterprise WLAN can then deliver 462 the SMS to the enterprise SMSF. The enterprise SMSF can then deliver 464 the SMS to the MNO SMSF for the UE.

At some point, the UE may disconnect 480 from the enterprise WLAN. The enterprise WLAN can then disconnect 482 and notify the DN-AAA. The DN-AAA can then remove 484 the enterprise WLAN private ID and realm for the UE.

Figure 5:
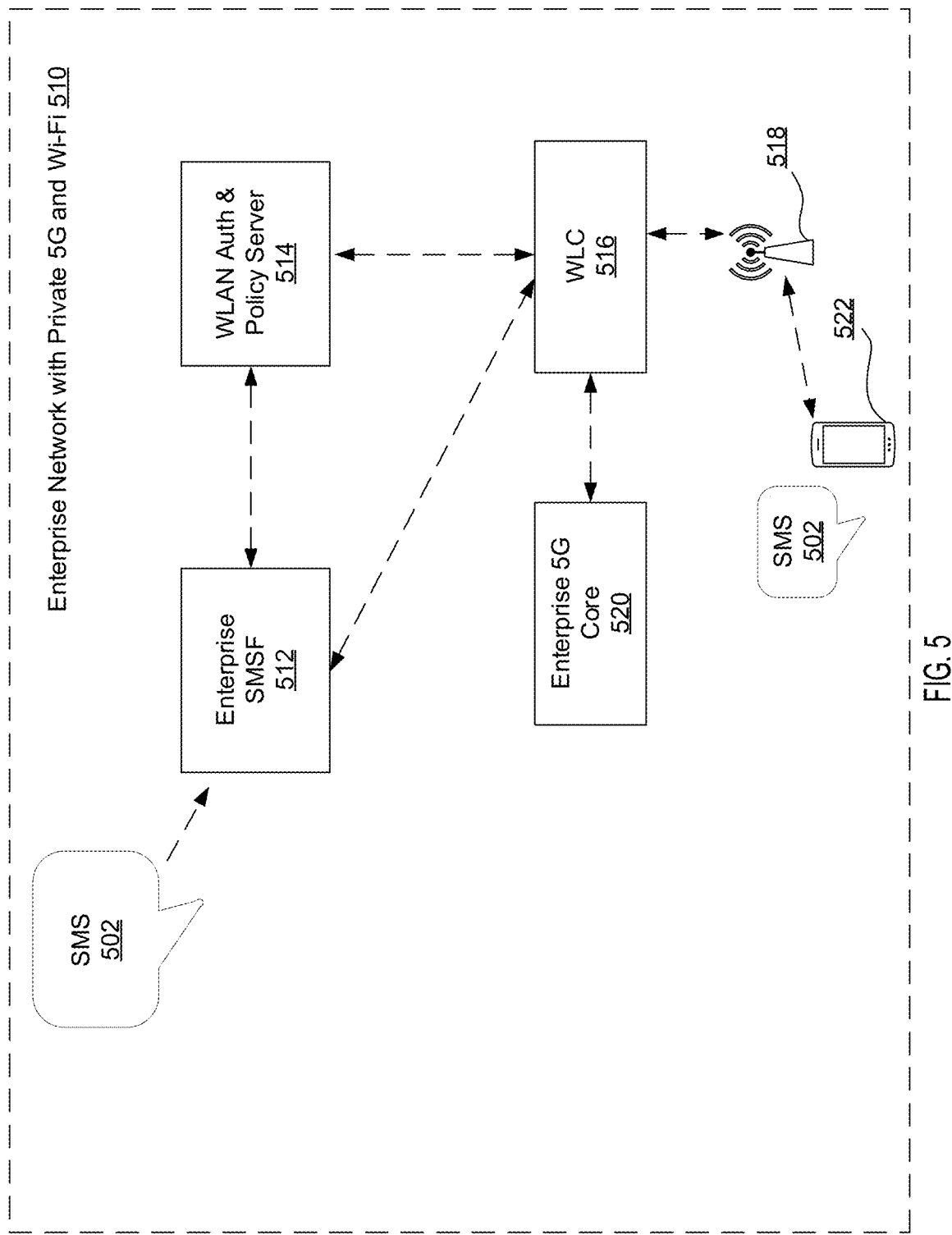
FIG. 5 illustrates an example environment having a user equipment in communication with a private 5G network and an enterprise WLAN.

FIG. 5 illustrates an example environment 500 having a UE 522 in communication with an enterprise WLAN 510 that is configured for both private 5G and WLAN.

Enterprise network 510 can include an enterprise SMSF 512, a WLAN Authentication and Policy Server 514, a WLC 516 in communication with one or more WLAN APs 518, an enterprise 5G core 520, and a UE 522.

Enterprise SMSF 512 provides SMS management subscription data and conducts SMS delivery. More specifically, enterprise SMSF 512 can manage subscription policies and associate UE 522 with private enterprise realms. In other words, enterprise SMSF 512 can associate a public or private 5G identity of UE 522 with a mapped private network realm to facilitate SMS delivery over enterprise network 510.

WLAN Authentication and Policy Server 514 authenticates user credentials. Additionally, authentication and policy server 514 can store subscription policies for each UE 522 connected to enterprise network 510. Furthermore, authentication and policy server can identify and/or otherwise determine which WLC 516 and/or WLAN APs 518 are connected to UE 522.

WLC 516 can establish secure connections to each network device and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the WLC 324 can operate as route reflectors. The WLC 324 can also orchestrate secure connectivity in a data plane between and among the edge network devices. For example, in some embodiments, the WLC 516 can distribute crypto key information among the network device(s). This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the WLC 516.

WLAN APs 518 are one or more networking devices that facilitate UE 522 to connect to enterprise network 510. WLAN APs 518 can also generate or create action frames that can include SMS payloads. WLAN APs 518 can then also send the action frame to UE 330 to deliver SMS messages.

Enterprise 5G Core 520 can be a core network as described above as core network 230 with respect to FIG. 2.

UE 522 can be a user equipment described above, such as UE 212 with respect to FIG. 2.

Figure 6:
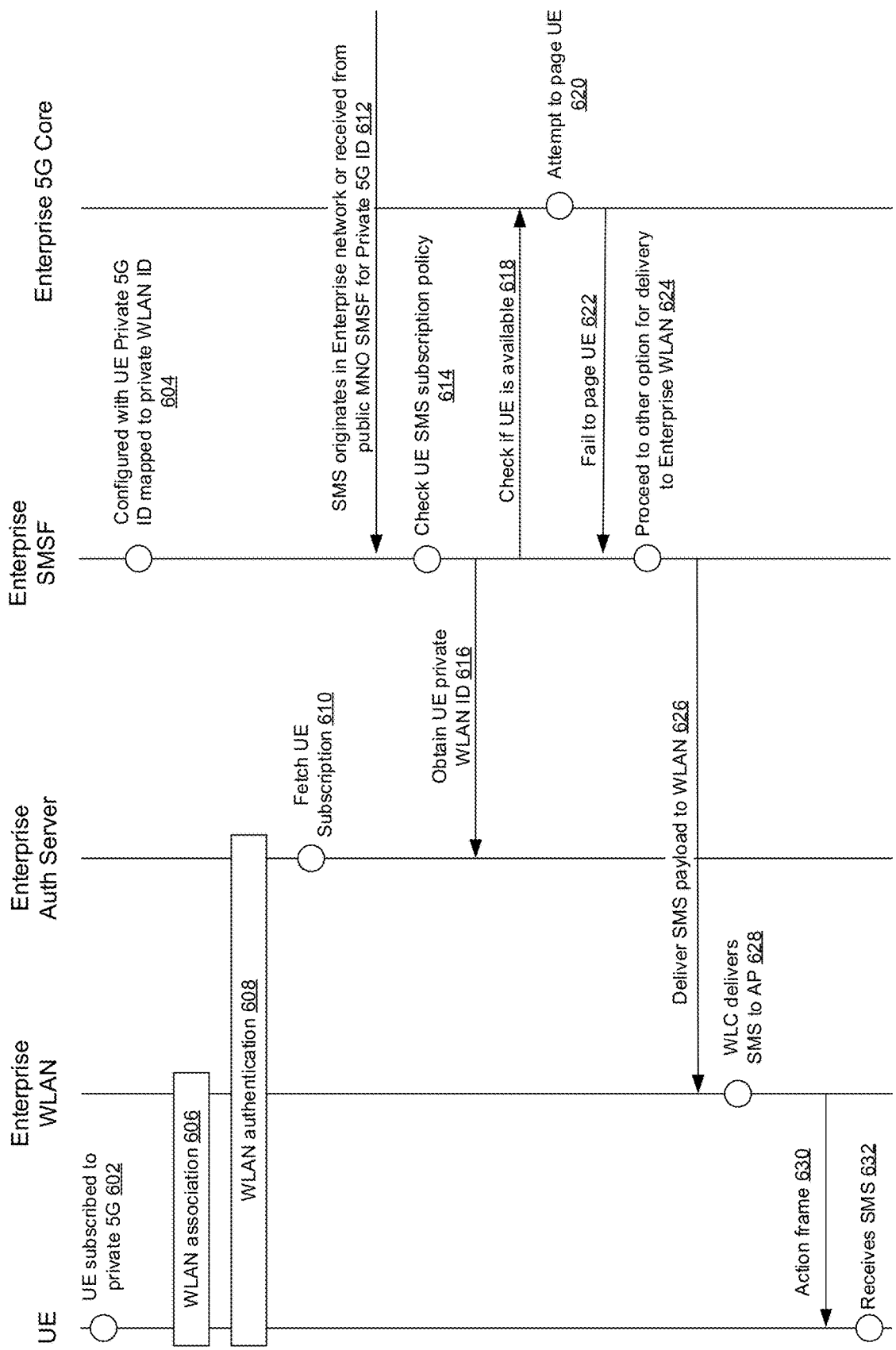
FIG. 6 illustrates an example flow diagram for delivering a short message service message to a user equipment through a private 5G network and an enterprise WLAN.
Figure 7:
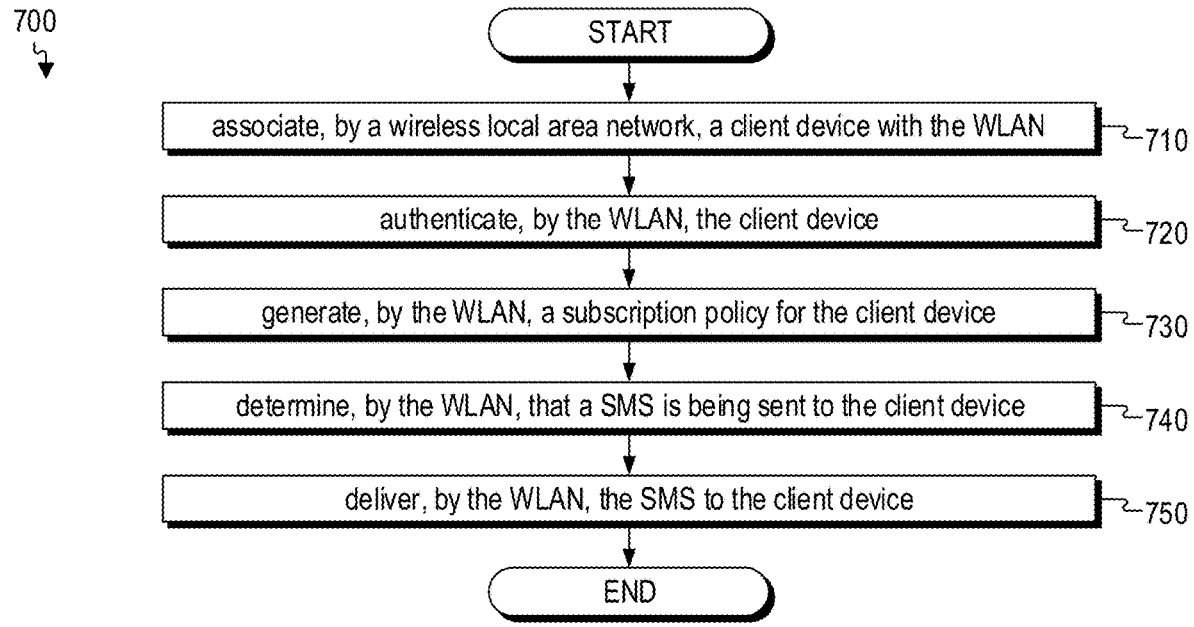
FIG. 7 is a flowchart of a method for delivering a short message service message to a user equipment through a 5G network and an enterprise WLAN.

FIG. 6 illustrates an example flow diagram for delivering an SMS message to a user equipment through a private 5G network and an enterprise WLAN.

UE (e.g., UE 522 described above with respect to FIG. 5) can be subscribed 602 to a private 5G network as discussed above with respect to FIG. 5. Additionally, when UE connects to an enterprise WLAN (e.g., enterprise network 510 described above with respect to FIG. 5), enterprise SMSF (e.g., enterprise SMSF 512 described above with respect to FIG. 5) can enterprise WLAN can be configured 604 with the UE private 5G identity mapped to a private WLAN identity. Thus, enterprise WLAN can associate 606 the UE with the enterprise WLAN. Additionally or alternatively, the UE can associate 606 with the enterprise WLAN.

Next, the enterprise authentication server (e.g., authentication and policy server 514 described above with respect to FIG. 5) can authenticate 608 the UE with the enterprise WLAN. The enterprise authentication server can then fetch 610 a UE subscription policy for the UE.

At some point, the enterprise SMSF may determine 612 that there is an incoming SMS message for the private 5G identity. The incoming message can originate in the enterprise WLAN or be received from a public MNO SMSF. Enterprise SMSF can then check 614 the UE's SMS subscription policy for SMS message delivery methods. For example, the subscription policy can indicate private 5G network delivery only, enterprise WLAN delivery only, first private 5G network then WLAN delivery, a preferred network delivery, replicate on all networks, etc.

Enterprise SMSF can then determine that the UE's SMS subscription policy indicates at least some usage of enterprise WLAN delivery. For example, the SMS subscription policy may indicate a preference to first attempt delivery through the private 5G network and on-failure deliver through the enterprise WLAN. Accordingly, the enterprise SMSF can deliver obtain 616 the UE private WLAN identity from the enterprise authentication server. The enterprise SMSF can then check 618 if the UE is available. The enterprise 5G core can then attempt to page 620 the UE. In some scenarios, the UE may be unavailable. Thus, the enterprise 5G core may determine 622 a failure to page the UE and notify 624 the enterprise SMSF of the failure. The enterprise SMSF can then proceed 624 to deliver 626 the SMS payload to the UE through the enterprise WLAN.

The enterprise WLAN can then deliver 628 (e.g., via a WLC, such as WLC 516 described above with respect to FIG. 5) the SMS payload to WLAN APs (e.g., WLAN APs 518 described above with respect to FIG. 5). In some embodiments, the SMS message can be sent 630 to the WLAN APs over CAPWAP. The WLAN APs can then create and send 630 an 802.11 action frame with the SMS payload to the UE. The UE then receives 632 the SMS message. Additionally, the action frame can include an indication that the SMS was sent to the private 5G identity but delivered via the enterprise WLAN.

FIG. 7 illustrates an example method 700 for delivering a short message service message to a user equipment through a 5G network and an enterprise WLAN. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some embodiments, the method includes associating, by a wireless local area network, a client device with the WLAN by assigning a WLAN identity to the client device at step 710. For example, enterprise SMSF 322, 512 illustrated in FIGS. 3 and 5 may associate, by a wireless local area network, a client device with the WLAN by assign a WLAN identity to the client device. In some embodiments, the 5G network is a public network. In some embodiments, the 5G network is a private network. In some embodiments, the 5G network is commonly owned with the WLAN. In some embodiments, the client device is subscribed to a 5G network.

According to some embodiments, the method includes authenticating, by the WLAN, the client device at step 720. For example, WLAN authentication and policy server 328, 514 illustrated in FIGS. 3 and 5 may authenticate, by the WLAN, the client device.

According to some embodiments, the method includes generating, by the WLAN, a subscription policy for the client device at step 730. For example, WLAN authentication and policy server 328, 514 illustrated in FIGS. 3 and 5 may generate, by the WLAN, a subscription policy for the client device. In some embodiments, the subscription policy specifies how to route to the client device from the 5G network through the WLAN. In some embodiments, the subscription policy further specifies how to route to the client device when the client device is coupled to the WLAN based on the WLAN identity.

According to some embodiments, the method includes determining, by the WLAN, that a short message service is being sent to the client device at step 740. For example, the MNO SMSF 312 and/or the enterprise SMSF 322, 512 illustrated in FIGS. 3 and 5 may determine, by the WLAN, that a short message service is be sent to the client device. In some embodiments, determining that the SMS is being sent to the client device includes receiving, by the WLAN, the SMS from the 5G network.

According to some embodiments, the method includes delivering, by the WLAN, the SMS to the client device at step 750. For example, the enterprise WLAN 310, 510 illustrated in FIGS. 3 and 5 may deliver, by the WLAN, the SMS to the client device.

Figure 8:
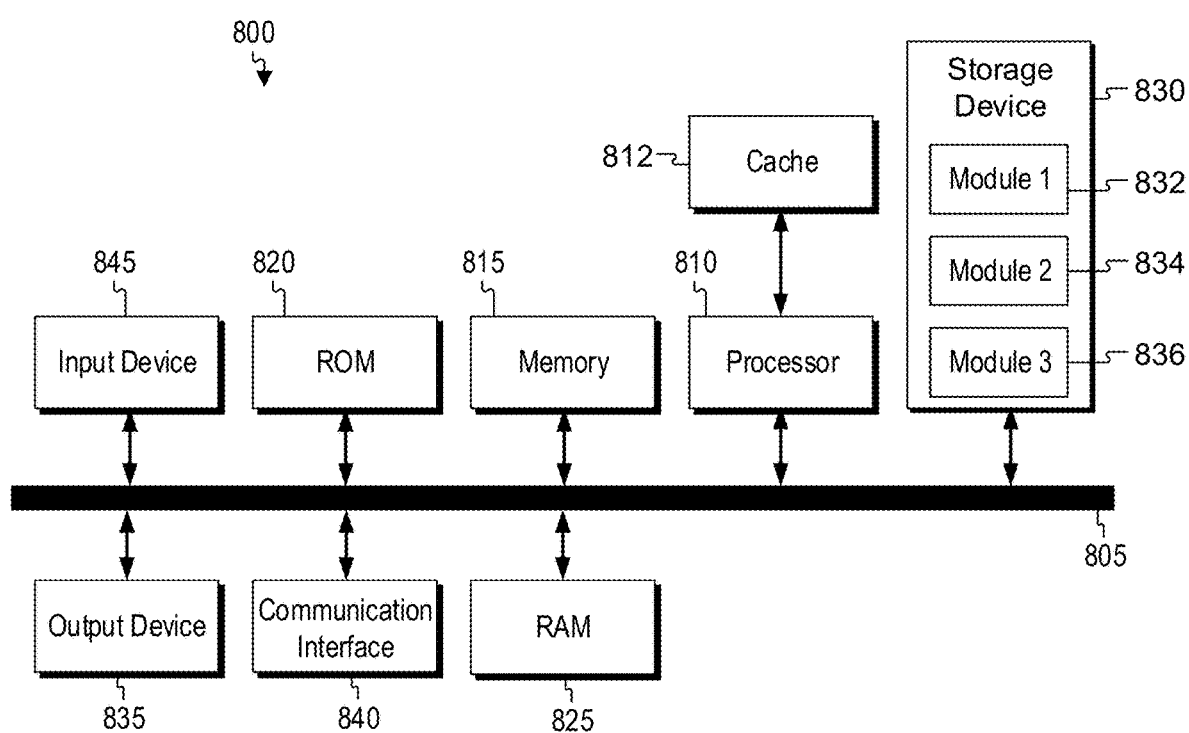
FIG. 8 shows an example of computing system 800, which can be for example any computing device that can implement components of the system.

FIG. 8 shows an example of computing system 800, which can be for example any computing device making up enterprise WLAN 310, 510 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
associating, by a controller of an enterprise wireless local area network (WLAN), a client device with the enterprise WLAN by assigning an enterprise WLAN identity to the client device, wherein the client device is subscribed to a 5G network;
authenticating, by the controller, the client device;
generating, by the controller, a subscription policy for the client device, wherein the subscription policy specifies how to route to the client device from the 5G network through the enterprise WLAN using a mapping between the enterprise WLAN identity and an identity of the client device in the 5G network;
receiving, by the controller and from the 5G network, a short message service (SMS) for the client device; and
delivering, by the controller, the SMS to the client device.

2. The computer-implemented method of claim 1, wherein the 5G network is a public network.

3. The computer-implemented method of claim 1, wherein the 5G network is a private network.

4. The computer-implemented method of claim 3, wherein the 5G network is commonly owned with the enterprise WLAN.

5. The computer-implemented method of claim 1, wherein the subscription policy further specifies how to route to the client device when the client device is coupled to the enterprise WLAN based on the enterprise WLAN identity.

6. A system comprising:
one or more memories configured to store computer-readable instructions;
one or more processors configured to execute the computer-readable instructions to cause a controller of an enterprise wireless local area network (WLAN) to:
associate a client device with the enterprise WLAN by assigning an enterprise WLAN identity to the client device, wherein the client device is subscribed to a 5G network,
authenticate-the client device, and
generate a subscription policy for the client device, wherein the subscription policy specifies how to route to the client device from the 5G network through the enterprise WLAN_using a mapping between the enterprise WLAN identity and an identity of the client device in the 5G network;
receive, from the 5G network, a short message service (SMS) for the client device; and
deliver the SMS to the client device.

7. The system of claim 6, wherein the 5G network is a public network.

8. The system of claim 6, wherein the 5G network is a private network.

9. The system of claim 8, wherein the 5G network is commonly owned with the enterprise WLAN.

10. The system of claim 6, wherein the subscription policy further specifies how to route to the client device when the client device is coupled to the enterprise WLAN based on the enterprise WLAN identity.

11. one or more non-transitory computer readable media comprising computer-readable instructions, which when executed by a controller of an enterprise wireless local area network (WLAN), cause the controller to:
associate a client device with the enterprise WLAN by assigning an enterprise WLAN identity to the client device, wherein the client device is subscribed to a 5G network;
authenticate the client device; and
generate a subscription policy for the client device, wherein the subscription policy specifies how to route to the client device from the 5G network through the enterprise WLAN using a mapping between the enterprise WLAN identity and an identity of the client device in the 5G network;
receive, from the 5G network, a short message service (SMS) for the client device; and
deliver the SMS to the client device.

12. The one or more non-transitory computer readable media of claim 11, the 5G network is a public network.

13. The one or more non-transitory computer readable media of claim 11, the 5G network is a private network.

14. The one or more non-transitory computer readable media of claim 13, the 5G network is commonly owned with the enterprise WLAN.

* * * * *